United States Patent Office 3,723,290
Patented Mar. 27, 1973

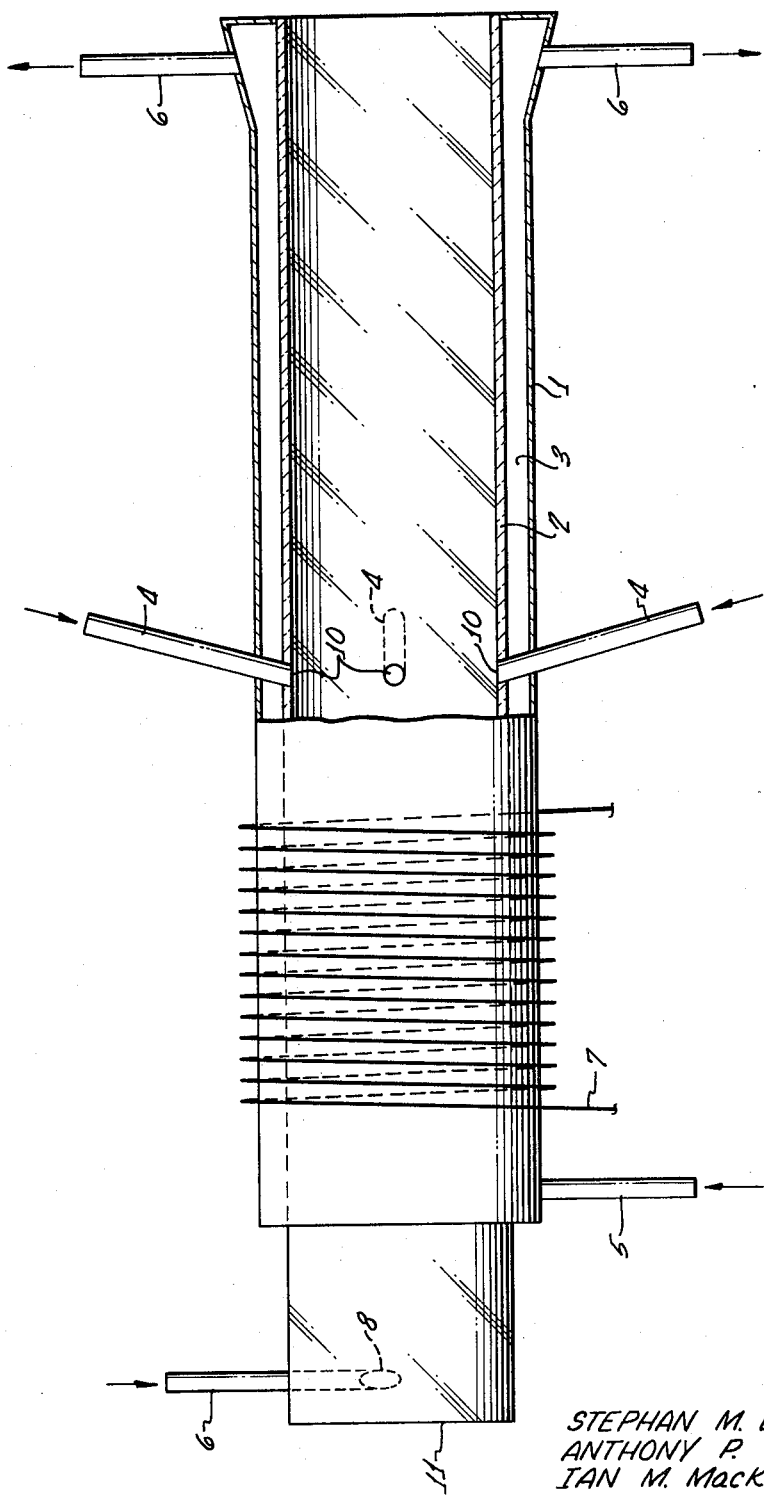

3,723,290
HIGH TEMPERATURE CHEMICAL REACTION APPARATUS
Stephen Mark Lesley Hamblyn, Long Ditton, Anthony Patrick Money, Surbiton, and Ian Malcolm MacKinnon, Kingston-upon-Thames, England, assignors to United States Borax & Chemical Corporation, Los Angeles, Calif.
Filed Jan. 7, 1970, Ser. No. 1,195
Int. Cl. B01k *1/00;* C01b *35/00;* H05b *7/00*
U.S. Cl. 204—328        3 Claims

ABSTRACT OF THE DISCLOSURE

Improvement in plasma generating apparatus in which the plasma-generating zone and downstream reaction zone are cooled by a cooling jacket surrounding the walls of the reaction vessel.

---

This invention relates to a method of effecting a chemical reaction at high temperature, and to apparatus for use in this method. The invention is an improvement in chemical processes using a plasma apparatus such as the invention described in Murdoch et al., Ser. No. 737,464, filed June 17, 1968 now Pat. No. 3,625,846, and assigned to the assignee of the instant invention.

The Murdoch et al. application describes a method of effecting a chemical reaction between at least two reactants, which comprises continuously passing a stream of a gas which may include one of the reactants through a reaction zone and forming a plasma of the gas within the reaction zone by radio-frequency coupling. One reactant is fed into the plasma at a point downstream of the center of the plasma in the direction of gas flow and another of the reactants is fed into the plasma-forming stream or into the formed plasma. A gas stream containing the resultant product of the high temperature reaction is formed and the product separated from the gas stream.

A particularly significant feature of this process is that the plasma wherein the two reactants undergo reaction at high temperature is a plasma formed by radio-frequency coupling, in the preferred form by induction coupling. Another significant feature is that the reaction takes place downstream of the center of the plasma, that is to say the two reactants are not fed together into the plasma forming zone and there heated by the induction heating to an ionizing temperature such that a plasma forms and reaction takes place. The plasma may be formed from an ionizable gas and both reactants be fed into the plasma or may be formed from an ionizable gas together with one reactant or from one reactant alone, the other reactant then being fed into the plasma.

In the process of Murdoch et al. it is preferred that the reactant fed into the plasma is delivered at an angle to the axis of gas flow. Thus, the apparatus comprises a generally cylindrical dielectric reaction vessel having inlet means for gas, a radio frequency induction coil surrounding a portion of said reaction vessel downstream of the inlet means so as to define therein a plasma-generating zone, and inlet means for a reactant which means are arranged to deliver the reactant into the vessel along a path inclined to the axis of said vessel on the side of the induction coil remote from said gas inlet.

We have now found that the reaction in the process of Murdoch et al. is improved if the reaction zone, that is the zone immediately downstream of the center of the plasma in which the high temperature chemical reaction takes place, is cooled during the reaction. The cooling can be effected by passing a refrigerant medium in indirect heat exchange relationship with the plasma. Preferably not only that part of the plasma which contains the reactants but the whole of the plasma is cooled.

In this modification of the process, the refrigerant medium preferably is water. However, a fluorinated hydrocarbon has also been found suitable.

Thus, the present invention provides an improvement in plasma apparatus such as described by Murdoch et al. in which at least that portion of the generally cylindrical dielectrical reaction vessel which surrounds the reaction zone is provided with means for removing heat from the reaction. Suitable means are a passage for the flow of refrigerant medium around the wall of the reaction vessel. The reaction zone is that portion of the reaction vessel within which the reaction will take place having regard to location of the induction coil and of the inlet means for reactant. Preferably both the plasma-generating zone (surrounded by the induction coil) and the reaction zone are provided with means for withdrawing heat.

It is surprising that in a process which depends on the input of energy by radio-frequency heating where economy of electric power is an important consideration there should be any advantage gained by dissipating heat into a refrigerant. However, it is found that by withdrawing heat from the wall of the reaction zone the formation of a crystalline product which would otherwise deposit on the lining of the zone is suppressed. A deposit of crystals on the wall of the reaction zone tends to impede the flow of gases, with consequent difficulty of maintaining a stable plasma, and also absorbs radio-frequency energy with consequent danger of damage to the apparatus.

Referring to the attached drawing which is a partial sectional elevation of a plasma generating apparatus according to this invention, the apparatus includes a quartz tube 2 which can be about 2 inches in diameter and about 2 feet long, closed at one end by a quartz cap 11 integral with the tube and open at its other end where it is connected to the remaining portion of the plasma apparatus. An inlet port 8 in cap 11 is connected by line 6 to a source of argon. The inlet port is arranged to deliver the gas tangentially of the circular tube. Downstream of the inlet port, an induction coil 7 surrounds the tube, coil 7 being connected to a source of radio-frequency power. The circumferentially spaced ports 10 are formed in tube 2 about 2 cm. downstream of the last turn of coil 7. The spacing between the coil and the ports can be varied so as to vary the point in the plasma at which a feed admitted through ports 10 contacts the ionized gas, thus varying the temperature at which the reaction takes place and the rapidity of cooling of the plasma. Port 10 is connected to respective quartz tubes 4, each tube 4 extending from its respective port preferably at an angle from the reaction tube. The quartz tube 2 is surrounded by a space 3 enclosed by a wall 1. The space is filled with a liquid coolant such as water by circulation. The coolant enters through tube 5 and exits through exit tube 6.

In using the apparatus for the production of elemental boron by reduction of boron trichloride, a preferred procedure is as follows: Argon is fed into the reaction zone through port 8 and as it follows along the tube, radio-frequency power supplied to the coil at, for example, about 10 kw. is coupled inductively to the argon so that the argon ionizes to form a visible plasma within the region surrounded by coil 7. To facilitate formation of a plasma, a spark may be struck in the argon by a Tesla coil, but generally it is not essential to strike a spark.

When the argon plasma has been formed so that the argon becomes conducting, hydrogen is mixed with the argon feed and the argon-hydrogen mixture is ionized, the power input being increased approximately to 30 kw. Gaseous boron trichloride is supplied to the plasma through ports 10 preferably being directed countercurrent to the direction of gas flow. The proportions and flow rates of the gas are adjusted for the formation of elemental boron which is collected as a fine powder in a cyclone separator (now shown). Recovered reactants can be recycled as desired.

When the same type of apparatus is utilized without cooling by a surrounding water jacket, it was found that a strongly adherent layer of boron crystals formed on the walls of the quartz wall 2. Thus, by providing the cooling jacket, such deposits are avoided.

Another significant feature of our improved plasma torch is that chemical reactions between solids and gases can be effected without severe erosion and chemical attack of the plasma containing tube. The solid reactant can be introduced as a fine powder, preferably 1–10$\omega$ means particle size, carried in a gas stream into the plasma directly via an axial water-cooled probe or as is preferred by injection into the tail region of the plasma. The cooling of the plasma-containing tube prevents build-up of condensed solids, and thereby enables the plasma to be run for substantial periods, for example 2–3 hours, without chemical attack occurring between the solid reactant and the silica or mechanical failure due to differential thermal expansion between solid and silica.

Various changes and modifications of the invention can be made and, to the extent that such variations incorporate the spirit of this invention, they are intended to be included within the scope of the appended claims.

What is claimed is:

1. In a plasma generating apparatus including a cylindrical dielectrical reaction vesel having a plasma-generating zone surrounded by a radio frequency induction coil and a downstream reaction zone, the improvement which comprises a cooling jacket surrounding said reaction zone and plasma-generating zone thereby cooling the walls of said reaction vessel.

2. The apparatus according to claim 1 in which water is circulated through said cooling jacket.

3. The apparatus according to claim 1 in which said cylindrical dielectrical reaction vessel is a quartz tube.

References Cited

UNITED STATES PATENTS

| 3,438,884 | 4/1969 | Juhola et al. | 204—164 |
| 3,491,015 | 1/1970 | Naff | 204—164 X |
| 2,924,625 | 2/1960 | Forshey | 204—323 X |
| 3,205,162 | 9/1965 | MacLean | 204—312 |
| 3,438,720 | 4/1969 | Cleaver | 23—1 |
| 3,345,280 | 10/1967 | Berghaus | 204—164 |
| 3,547,802 | 12/1970 | Gleit et al. | 204—312 |

FOREIGN PATENTS

| 1,582,154 | 9/1969 | France | 204—323 |

F. C. EDMUNDSON, Primary Examiner

U.S. Cl. X.R.

204—164